United States Patent [19]

Hijikata et al.

[11] 3,832,117
[45] Aug. 27, 1974

[54] UNIT FOR APPLYING COVERING SHEET FOR USE IN VACUUM SEALED MOLDING

[75] Inventors: Itsuo Hijikata, Nagoya; Masayoshi Kasazaki, Toyokawa; Hideto Terada, Toyokawa; Takao, Inoue, Toyokawa, all of Japan

[73] Assignee: Sintokogio, Ltd., Nagoya, Japan

[22] Filed: Oct. 11, 1973

[21] Appl. No.: 405,422

[30] Foreign Application Priority Data
Oct. 12, 1972   Japan............................ 47-102458
Oct. 12, 1972   Japan............................ 47-102459

[52] U.S. Cl................. 425/388, 219/388, 264/25, 264/92, 425/305, 425/DIG. 200
[51] Int. Cl.............................................. B29d 17/00
[58] Field of Search.......... 219/216, 385, 386, 388; 264/25, 90, 92; 425/383, 305, 388, DIG. 200; 53/184

[56] References Cited
UNITED STATES PATENTS

| | | | |
|---|---|---|---|
| 3,066,211 | 11/1962 | Vogt | 264/92 X |
| 3,105,270 | 10/1963 | Fibish | 425/145 |
| 3,115,677 | 12/1963 | Thiel | 264/92 |
| 3,123,700 | 3/1964 | Snyder et al. | 219/388 |
| 3,157,719 | 11/1964 | Ferrari | 264/92 |
| 3,177,060 | 4/1965 | Pedersen | 264/92 X |
| 3,190,946 | 6/1965 | Keyes | 264/92 |
| 3,476,840 | 11/1969 | Glassford | 219/388 X |
| 3,527,854 | 9/1970 | Martin et al. | 264/92 X |
| 3,561,057 | 2/1971 | Butzko | 425/384 X |
| 3,650,655 | 3/1972 | Santouris | 425/388 X |

*Primary Examiner*—Volodymyr Y. Mayewsky
*Attorney, Agent, or Firm*—Armstrong, Nikaido & Wegner

[57] ABSTRACT

A covering sheet applying unit and a method for heating said covering sheet in which a covering sheet holding frame is movably provided between a pattern plate for vacuum sealed molding mold and a heating means for uniformly heating the covering sheet to be applied on the surface of said pattern plate, a pressing plate is disposed at the end of the moving range of said holding frame, the covering sheet drawn from the web of the covering sheet is held on said holding frame and then moved in the vicinity of said pattern plate, and the covering sheet is, after being uniformly heated, applied on the pattern plate.

11 Claims, 6 Drawing Figures

UNIT FOR APPLYING COVERING SHEET FOR USE IN VACUUM SEALED MOLDING

BACKGROUND OF THE INVENTION

In the vacuum sealed molding process, a mold is formed by compacting dry sand or similar heat resisting particulate material in a molding flask with the use of a vacuum. It is a feature of this molding process that, to establish and maintain a vacuum in the molding flask, the surfaces of the mold cavity are covered with a non-permeable covering sheet such as plastic film, plastic molding, and metal foil film.

In this molding process, the removal of casting product after the pouring of molten metal can be carried out merely by releasing the negative pressure applied on the mold since the heat resisting particulate material is compacted and formed only by the vacuum applied thereto. Further, as no water or binder is added to the particulate material, the recovered particulate material can, as it is, be utilized in the next mold forming step. Thus, in this molding process, there are a number of advantages such as elimination of the after-treatment apparatus for sand which has been indispensable in foundries.

However, according to this molding process, the surfaces of the mold cavity need to be covered with the covering sheet, as described above. For this reason, the covering sheet must be, in a suitable operation step, applied tightly on the surface of a pattern plate used in forming a mold. When the covering sheet is applied on the surface of the pattern plate, it is necessary to surely keep the covering sheet in a tense state. This is a case particularly when a plastic film is used as the covering sheet. In the prior art covering sheet applying units, the plastic film is held in position by putting the both surfaces of the plastic film between two rubber plates and the like. This method has a grave disadvantage of uncertain holding caused by the slipping of plastic film, inadequate fastening strength, and so forth. In this method, when the plastic film is drawn forcedly and extended to other places, the plastic film tends to come off the holding means to slip off a predetermined position. If the plastic film is fastened with a strong force, the fastened parts of the plastic film are very likely to be damaged. In addition, the width of the plastic film must be larger than that of the pattern plate so that the fastening means are never brought into contact with the pattern plate. This naturally constitutes an uneconomical feature of the method.

To obtain casting products precise in dimensions and having smooth surfaces, the plastic film must be applied on the surface of the pattern plate with no wrinkles or other irregularities existing on the plastic film surface. In attaining this purpose, the prior art employs the steps of maintaining the plastic film in a tense state by surely holding the plastic film peripheries, heating the plastic film at a suitable temperature, and applying the plastic film on the pattern plate when the plastic film contracts after it once expanded. In this case, if a sheathed heater or other heating is brought, for the purpose of heating, in the vicinity of the plastic film, the peripheries of which are supported in a suitable frame, only an inadequate heating is performed in the parts of the plastic film close to the frame. If these parts of the plastic film are subjected to a sufficient heating, the central part of the plastic film is overheated, resulting in the breakage of the plastic film. It has been studied to arrange the heating sources so that the peripheral parts of the plastic film are heated especially sufficiently, but this remains even now as an unsolved technical problem due to the influence of heat to the frame. Although a heated wind may be blown directly to the plastic film for heating the same, uniform application of the heated wind over the whole plastic film has been very difficult, thus resulting only in an uneven heating. Especially when the plastic film arranged in the vertical position is heated, heated air moves upward and merely the upper part of the plastic film is heated partly and rapidly, which leads to frequent breakage of the plastic film.

SUMMARY OF THE INVENTION

In accordance with the present invention, for the purpose of solving above-described problems, a pattern plate is provided opposite to and spaced apart from a plastic film heating means, a pressing plate having suction slots for holding a plastic film is disposed movably and in parallel with said pattern plate, a holding frame having a periphery thereof a suction slot for holding the plastic film is arranged movably between said heating means and said pattern plate, the plastic film is received from said pressing plate and transferred in the vicinity of the pattern plate, and the plastic film is, after it has been uniformly heated, applied on the surface of the pattern plate.

In the plastic film applying unit described above, a frame is interposed between the plastic film and the heating means, and the air for heating the plastic film confined in a space defined by the plastic film, the heating means, and the frame is forcedly put in a convection movement with the introduction of compressed air to uniformly heat said plastic film.

DETAILED DESCRIPTION OF THE INVENTION

Figure 2:
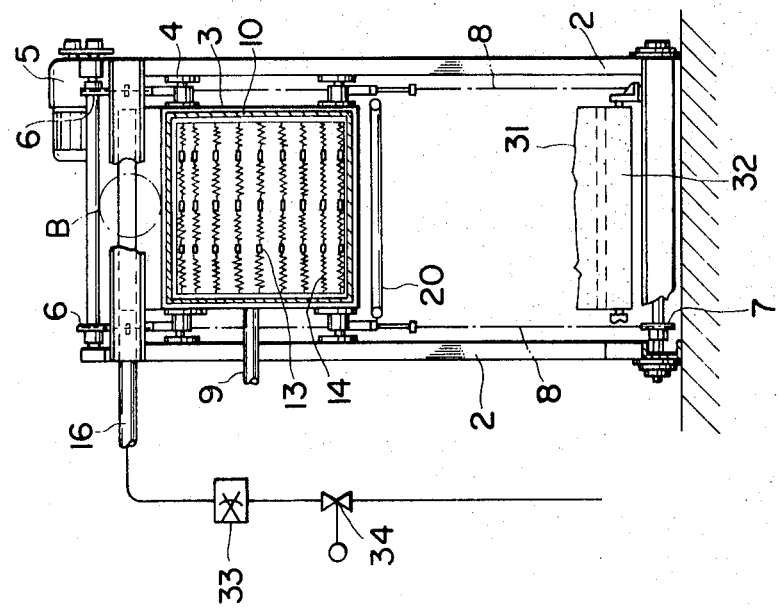
FIG. 2 is a cross sectional view taken along the line A—A of FIG. 1.

The present invention will be described in detail with reference to an embodiment thereof shown in the drawings.

Referring to the drawings, in front of a frame 1 is provided vertical frames 2 serving as guide rails and to which is vertically movably engaged, through wheels 4, a holding frame 3 opening both forward and backward. The upper and lower parts of the holding frame 3 are connected to chains 8 engaging with chain wheels 6 which makes normal and reverse rotations by means of a motor 5 and with follower chain wheels 7 arranged at the lower part of the frames 2. The chains 8 constitute an endless form through the holding frame 3.

An annular suction slot 10 in communication with a vacuum pump (not shown) through a hose 9 is bored in the front periphery of the holding frame 3. A permeable filler 11 is filled in the suction slot 10. A radiation heating means 12 opening forward is securely fixed to the frame 1 in such a manner that, when the holding frame 3 comes to the uppermost end of its vertical travel, said radiation heating means 12 is located behind the holding frame 3 with a slight amount of space kept therebetween. Within the heating means 12 is provided a heat source 14 consisting of heating wires, for example, a large number of coiled nichrome wires, supported by heat resisting insulators 13, or of an infrared ray heater, a gas burner and the like. At the rear upper part of the heating means 12 is disposed a pipe 16 having many air discharging perforations 15, which is connected to a cover 17 in communication with the interior of said heating means 12. The opening of the holding frame 3 and the heating means 12 are substantially of the same size. The distance between the heat source 14 and the front surface of the holding frame 3 is so determined that the plastic film is located in a range it can be effectively heated by the radiation heat of the heat source 14. Beneath the heating means 12 is arranged, slightly spaced apart therefrom, a cylinder 18, a piston rod 19 of which has at its end a film cutter 20 having a nichrome wire heater.

A pattern plate 21 is provided opposite to and in front of the heating means 12 disposed in the frame 1. Said pattern plate 21 is securely fixed to a piston rod 23 of a cylinder 22 arranged on a turntable 24 so that it can move forward and backward (see the arrow in FIG. 1). To the pattern palte 21 is connected a suction pipe 25 which is further connected to a vacuum pump (not shown) for applying a vacuum suction on the surface of the pattern plate 21. A cylinder 26 is arranged beneath said pattern plate 21 and in front of the frame 1. At the end of the piston rod of the cylinder 26 is fixed a pressing plate 27 in the opposite position of the frame 1. Plastic film suction slots 28 similar to that of the holding frame 3 are bored in the upper and lower parts of the side of the pressing plate 27 facing the frame 1. Alternatively, a plastic film suction slot 28 may be provided along a rectangular periphery of said side of the pressing plate 27 facing the frame 1. Said slots 28 communicate, through an internal passage not shown, with a suction pipe 29 connected to a vacuum pump. The suction slots 28 in the pressing plate 27 are constructed such that the covering sheet is held substantially evenly in a plane covering the opening of the holding frame 3. Numeral 30 indicates a plastic film web. A plastic film 31 drawn from said plastic film web 30 through a guide roller 32 arranged on the frame 1 is in advance sucked in and held at the suction slots 28 in the pressing plate 27. Numeral 33 designates an air flow control valve disposed in the middle of the pipe 16 and numeral 34 indicates an electromagnetic valve.

Figure 1:
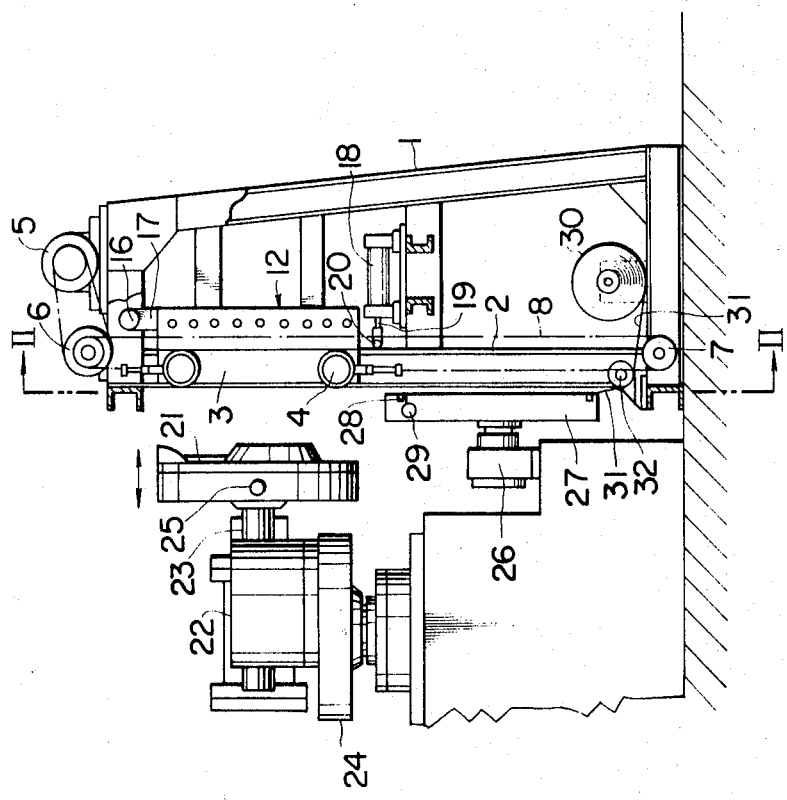
FIG. 1 is a side view partly broken away and showing the covering sheet applying unit according to the present invention with the pattern plate retracted.
Figure 3:
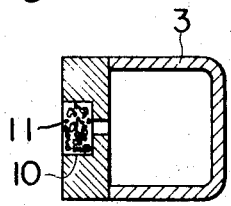
FIG. 3 is a sectional view of the holding frame.
Figure 4:
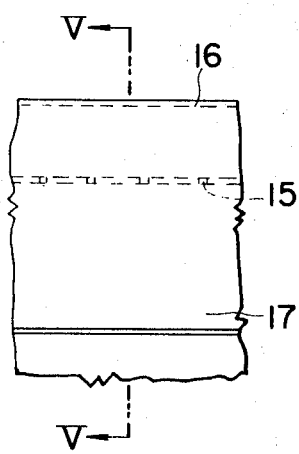
FIG. 4 is an enlarged view illustrating the section B of FIG. 2.
Figure 5:
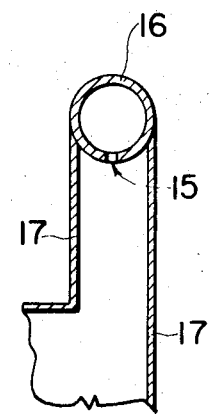
FIG. 5 is a cross sectional view taken along the line C—C of FIG. 4.

In operation, when the covering sheet applying unit is set in the state shown in FIG. 1, the motor 5 is energized for moving the holding frame 3 downward along the vertical frames 2 to stop at a position opposite to the pressing plate 27. After the cylinder 26 was actuated to press the pressing plate 27 on the holding frame 3, the hose 9 of the holding frame 3 is brought in communication with a vacuum pump not shown to provide a vacuum suction in the suction slot 10 for holding the plastic film 31 into the holding frame 3. Then, the vacuum suction in the suction pipe 29 of the pressing plate 27 is released. To avoid the interference with the holding frame 3, the cylinder 26 is moved in the reverse direction for restoring the pressing plate 27 to the original position. Subsequently, the motor 5 is rotated in the reverse direction so that the holding frame 3 holding the plastic film 31 thereon returns to its original position while drawing the plastic film 31 from the plastic film web 30.

Next, the cylinder 26 is actuated again to push the pressing plate 27 so that it is in contact with the plastic film 31. A vacuum suction is again provided in the suction pipe 29 in order that the suction slots 28 can suck and hold the plastic film 31. Then, by the actuation of the cylinder 18, the plastic film cutter 20 having a nichrome wire heater contacts the plastic film 31 to cut it. After this cutting operation, the cylinder 26 is moved in the reverse direction to restore the pressing plate 27 to the original position (the state shown in FIG. 1). In this state, the unit stands ready for the next operation.

On the other hand, when the holding frame 3 holding the plastic film 31 thereon moves upward and reaches its original position, the heat source 14 of the heating means 12 begins to radiate heat, and at the same time, the electromagnetic valve 34 is actuated. Thus, air under pressure, the amount of which is controlled by the air flow control valve 33, is supplied to the interior of the heating means 12 through the pipe 16 and the cover 17. At this time, the air under pressure is introduced into the upper part of the heating means 12 to slowly move downward inside the heating means 12. For this reason, the air heated by the heat source 14 and moved upward is pushed downward by the air under pressure being slowly introduced into the heating means 12, and begins a convention movement. In this way, the heated air within the hollow defined by the heating means 12, the holding frame 3, and the plastic film 31 performs a convection movement so that the whole of the plastic film 31 is uniformly heated by the radiation heat and the heated air in convention movement. Excessive air is released to the atmosphere through a space between the heating means 12 and the holding frame 3.

Figure 6:
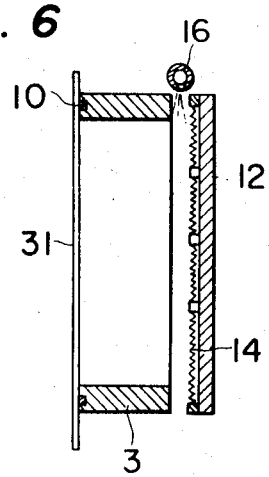
FIG. 6 is a sectional view showing another embodiment of the heating means according to the present invention.

After the plastic film 31 has been uniformly heated for a suitable period of time, heat radiating operation of the heat source 14 and supplying operation of the compressed air are terminated. Then, the cylinder 22 is actuated to press the pattern plate 21 to the holding frame 3. The suction pipe 25 is brought into communication with the vacuum pump for providing a vacuum suction on the surface of the pattern plate 21 to apply the plastic film 31 thereon. Immediately after this operation, the communication between the vacuum pump and the hose 9 of the holding frame 3 is terminated. Subsequently, the cylinder 22 is moved in the reverse direction for returning the pattern plate 21 to the original position. The turntable 24 is rotated and the cylinder 22 is actuated to move the pattern plate 21 to a molding position (not shown). As soon as a mold is formed, the pattern plate 21 is restored to its original position for standing by. During this molding operation, the holding frame 3 repeats the steps described in the foregoing for performing the heating of the plastic film 31. When the plastic film 31 has been uniformly heated, the pattern plate 21 begins to repeat the operation steps described above. In this embodiment, the heating means 12 is constructed as a box-like frame opening forward. However, if the plastic film holding frame 3 has a large horizontal length, the heating means 12 may be constructed, as shown in FIG. 6, in the form of a simple plate to which is fixed the heat source 14. In this arrangement, the compressed air discharging pipe 16 may be provided in the upper part of a space between the heating means 12 and the holding frame 3 for attaining the same effect as this embodiment. Again in this embodiment, the plastic film 31 is applied on the pattern plate 21 arranged in the vertical position by moving the holding frame 3 vertically. The plastic film 31 also may be applied on the pattern plate 21 arranged in the horizontal position by constructing the covering sheet applying unit so that the whole unit shown in FIG. 1 is rotated 90 degrees counterclockwise and the holding frame 3 is movable horizontally.

As described in the foregoing, in the present invention, the plastic film is held surely by the holding frame, drawn forcedly from the plastic film web, and applied on the pattern plate. In particular, since the plastic film is held by the suction slot communicating with the vacuum pump, the plastic film never slips off a predetermined position or comes off the plastic film holding means in contrast to a discontinuous plastic film fastening system in which such disadvantages phenomena often take place. Further, compared with the conventional plastic film holding system where the plastic film is held discontinuously (held by several points) in the holding system according to the present invention the plastic film is held continuously (held by lines), which leads to a surer holding of the plastic film. Thus, the plastic film can be applied uniformly on the whole surface of the pattern plate without any damage to the parts of the plastic film where it is held. As a vacuum suction is applied to the back side (which is reverse to the side applied on the pattern plate) of the plastic film by the holding frame, the plastic film can be held by the holding frame regardless of size, shape, and other factors of the pattern plate. This results in an advantage that all of the usable area of the plastic film can be used effectively. Moreover, as described previously, the plastic film is kept within a range of distance where it can be heated by the radiation heat of the heat source, and the holding frame is provided between the plastic film and the heat source so that the compressed air is supplied into the interior of the holding frame at the upper part of the holding frame. Thanks to this arrangement, the plastic film is, on the one hand, heated by the radiation heat of the heat source, and is, on the other hand, uniformly heated in a short period of time by the heated atmosphere forcedly put in a convection movement by the compressed air. Thus, the heating system according to the present invention is very effective in uniformly heating the whole surface of a thin film such as the plastic film used in vacuum sealed molding.

We claim:

1. A unit for applying a covering sheet on a pattern plate for vacuum sealed molding comprising, a window, frame-shaped covering sheet holding frame having an opening and a suction slot provided in the periphery of said opening for applying a vacuum suction to said covering sheet to suck the same thereto and adapted to hold said covering sheet substantially evenly over said opening and also adapted to reciprocate between an applying position for applying said covering sheet on said pattern plate and a receiving position for receiving and holding the covering sheet supplied to said opening;

a covering sheet supply roll having said covering sheet wound thereon and arranged to supply the covering sheet to said holding frame moved to said receiving position;

a covering sheet holding and pressing means having suction slots for holding said covering sheet by vacuum suction and adapted to hold said covering sheet substantially evenly over a plane covering said opening and also adapted to move for pressing the covering sheet supplied from said supply roll and held thereon onto said holding frame moved to said receiving position to apply said covering sheet substantially evenly on said holding frame and further adapted to again hold, after the movement of said holding frame to said applying position, the covering sheet drawn to said receiving position from said supply roll due to the movement of said holding frame;

a covering sheet cutting means provided between said applying position and said receiving position and adapted to cut the covering sheet to be applied on said pattern plate after said holding frame has moved to said applying position and said covering sheet holding and pressing means has held the covering sheet drawn to said receiving position;

a covering sheet heating means adapted to heat the covering sheet held on said holding frame located in said applying position for facilitating plastic deformation of said covering sheet when said covering sheet is applied on said pattern plate; and a pattern plate moving means adapted to carry said pattern plate and arranged to move said pattern plate to said applying position for applying on said pattern plate the heated covering sheet held on said holding frame and also adapted to move said pattern plate with said covering sheet applied thereon to a position for molding.

2. A unit as claimed in claim 1 in which said covering sheet cutting means includes heating wires and is adapted to cut said covering sheet by heating and melting the same.

3. A unit as claimed in claim 1 in which said covering sheet holding frame has wheels, and said unit further comprises a rotating driving means adapted to make normal and reverse rotations, driving wheels adapted to make normal and reverse rotations by means of said driving means, follower wheels, and a chain means in engagement with said driving and follower wheels and having both ends thereof connected to said holding frame constitute an endless form and arranged to reciprocate said holding frame between said applying position and said receiving position.

4. A unit as claimed in claim 1 in which a permeable filler is filled in the suction slot of said covering sheet holding frame.

5. A unit as claimed in claim 1 in which a permeable filler is filled in the suction slots of said covering sheet holding and pressing means.

6. A unit as claimed in claim 1 in which said pattern plate moving means comprises a rotating means adapted to move said pattern plate between a first position and a second position, and a piston and cylinder means adapted to, in said first position, reciprocate said pattern plate between said applying position and a remote position apart from said applying position and, in said second position, reciprocate said pattern plate between said position for molding and a remote position apart from said position for molding.

7. A unit as claimed in claim 1 in which a compressed air discharging means is provided which is adapted to discharge compressed air so that, while said heating means is heating the covering sheet held on said holding frame, the high temperature air heated by said heating means is forcedly put in a convection movement for uniformly heating said covering sheet.

8. A unit as claimed in claim 7 in which said heating means is fixed to an attaching plate means provided opposite to the covering sheet held on said holding frame, and said compressed air discharging means is arranged such that said compressed air is discharged into a space defined by the covering sheet held on said holding frame and said attaching plate means and including said heating means.

9. A unit as claimed in claim 8 in which said covering sheet holding frame makes a reciprocating movement in the vertical direction, and said compressed air discharging means is so arranged that the compressed air is discharged into said space vertically downward from upper part to lower part of the space.

10. A unit as claimed in claim 7 in which said attaching plate means has a side wall means formed as surrounding said space to prevent outflow of the high temperature air put in a convection movement within said space and inflow of external air into said space.

11. A unit as claimed in claim 1, wherein said covering sheet heating means is an electric heating means.

* * * * *